United States Patent
Nguyen et al.

(10) Patent No.: US 12,166,606 B2
(45) Date of Patent: Dec. 10, 2024

(54) SYSTEMS AND METHODS FOR OPTIMIZATION AND ESTIMATION OF NONLINEAR MIMO SYSTEMS WITH DEEP NEURAL NETWORKS

(71) Applicant: San Diego State University (SDSU) Foundation, San Diego, CA (US)

(72) Inventors: Duy H. N. Nguyen, San Marcos, CA (US); Van Ly Nguyen, San Diego, CA (US)

(73) Assignee: San Diego State University (SDSU) Foundation, San Diego, CA (US)

( * ) Notice: Subject to any disclaimer, the term of this patent is extended or adjusted under 35 U.S.C. 154(b) by 148 days.

(21) Appl. No.: 17/698,915

(22) Filed: Mar. 18, 2022

(65) Prior Publication Data
US 2022/0303159 A1    Sep. 22, 2022

Related U.S. Application Data

(60) Provisional application No. 63/200,625, filed on Mar. 18, 2021.

(51) Int. Cl.
*H04L 25/02*      (2006.01)
*H04B 7/0413*      (2017.01)

(52) U.S. Cl.
CPC ....... *H04L 25/0254* (2013.01); *H04B 7/0413* (2013.01); *H04L 25/0204* (2013.01)

(58) Field of Classification Search
CPC ............ H04L 25/0254; H04L 25/0204; H04B 7/0413
See application file for complete search history.

(56) References Cited

U.S. PATENT DOCUMENTS

| | | | | |
|---|---|---|---|---|
| 10,552,727 | B2 * | 2/2020 | Caspi | H04L 43/045 |
| 10,616,257 | B1 * | 4/2020 | Soulhi | H04L 63/1425 |
| 2005/0283450 | A1 * | 12/2005 | Matsugu | G06N 3/049 706/20 |
| 2020/0333424 | A1 * | 10/2020 | Shi | H04W 4/02 |
| 2021/0264279 | A1 * | 8/2021 | Esser | G06F 17/16 |
| 2022/0014398 | A1 * | 1/2022 | Andrews | G06N 3/09 |
| 2023/0403699 | A1 * | 12/2023 | Hajri | H03M 7/30 |

OTHER PUBLICATIONS

Dahlman et al., 5G NR the Next Generation Wireless Access Technology, 2011, Academic Press, Second Edition, pp. 225-240 (Ch. 11). (Year: 2011).*

* cited by examiner

*Primary Examiner* — David B Lugo
(74) *Attorney, Agent, or Firm* — Eleanor Musick; Torrey Pines Law Group PC

(57) ABSTRACT

A method for designing a channel estimation and data detection networks is provided herein. The problem of channel estimation for linear systems has effectively been solved—not the case for non-linear systems. A deep learning framework for channel estimation, data detection, and pilot signal design is described to address the nonlinearity in such systems.

20 Claims, 14 Drawing Sheets

(b) $c_1 = 0.05$ (a) $c_1 = 0.01$.

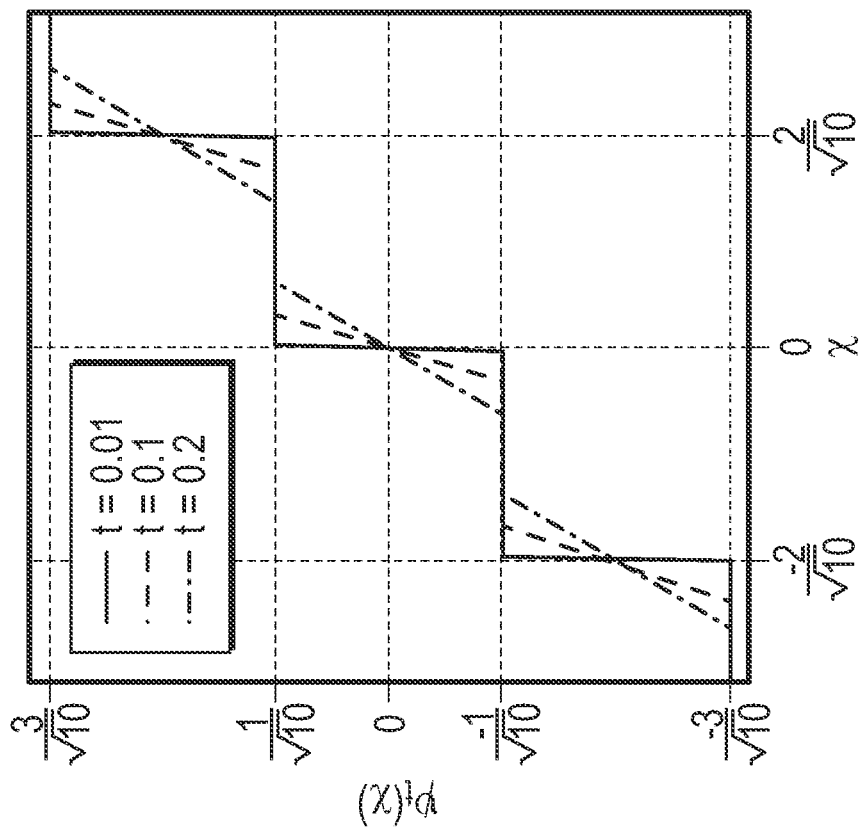
FIG. 10B (b) 16QAM Signaling.
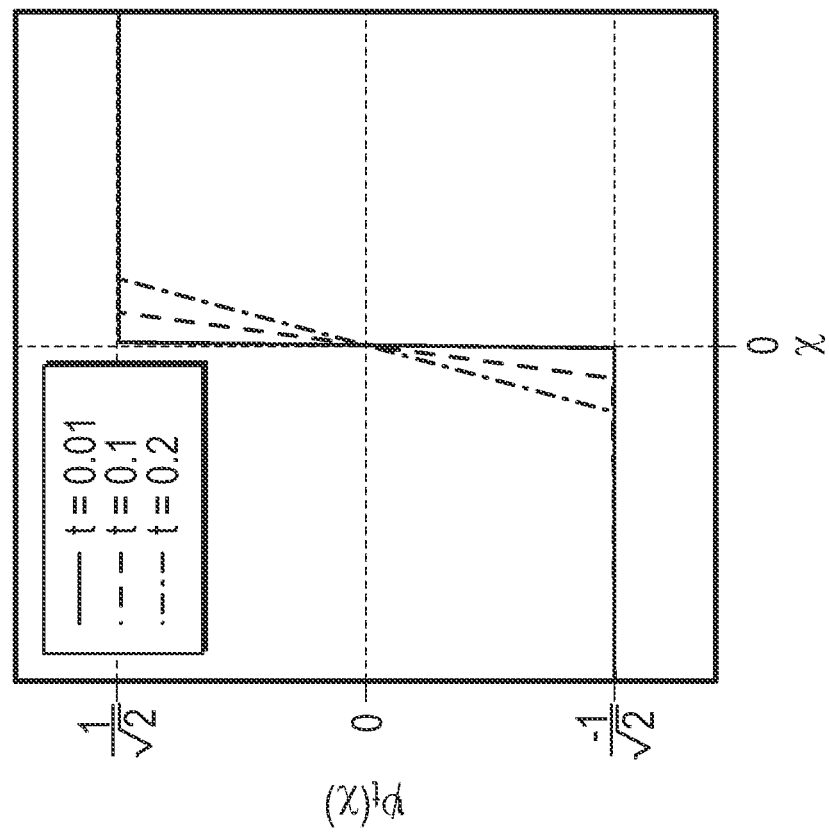
FIG. 10A (a) QPSK Signaling.

SYSTEMS AND METHODS FOR OPTIMIZATION AND ESTIMATION OF NONLINEAR MIMO SYSTEMS WITH DEEP NEURAL NETWORKS

CROSS-REFERENCE TO RELATED APPLICATIONS

This application claims priority from U.S. Provisional Application No. 63/200,625, filed on Mar. 18, 2021, which is incorporated herein by reference in its entirety.

STATEMENT REGARDING FEDERALLY SPONSORED RESEARCH OR DEVELOPMENT

This invention was made with government support under Grant Number 2146436 awarded by the National Science Foundation. The government has certain rights in the invention.

FIELD

The present disclosure generally relates to systems and methods for designing a channel estimator and data detection networks.

INTRODUCTION

With globalization, existing networks are facing high traffic demands. Increased mobile broadband service, along with implementation of the Internet of Things (IoT) and Machine-to-Machine Communication (M2M) are contributing to exponential growth in wireless traffic. As technology approaches a fully cellphone-connected world, the amount of mobile data traffic could become overwhelming.

A significant challenge for expansion of wireless communication infrastructure to handle this growth is its dependence on either increasing the spectrum or densifying the cells to achieve the targeted area throughput. Such resources are in demand and approaching their saturation points, with further challenges introduced by hardware cost and increased latency. Spectral efficiency, which can enhance the area throughput, has remained essentially unchanged through the rapid growth of wireless systems. Effective improvement of wireless access technology must somehow be achieved without relying on increased spectrum or densifying the cell.

Multi-input multi-output, or MIMO, is one of the most promising technologies to deliver the requirements of 5G and beyond networks. MIMO utilizes many dimensions to account for multiple antennae, multiple users, and time and frequency resources. Channel estimation, which involves sending a known signal from a transmitter to a receiver to estimate unknown channel state information (CSI), is key for MIMO wireless systems. The availability of CSI leads to improved spectral and energy efficiency, with reductions of the effects of noise and interference. MIMO signal processing, specifically linear MIMO systems, is fairly predictable, as shown in the literature.

Non-linear MIMO systems, however, generate less than predictable results. The nonlinearity caused by low-resolution analog-to-digital converters (ADCs) makes channel estimation and data detection in few-bit MIMO systems much more challenging, compared to those in unquantized systems. A common approach to address such systems is to linearize the system by Bussgang decomposition, producing a Bussgang-based minimum mean-square error channel estimator (BMMSE). Briefly, the decomposition provides an exact probabilistic relationship between the output and the input of a non-linearity: the output is equal to a scaled version of the input plus uncorrelated distortion. This solution is not ideal, as the observation is not Gaussian, in addition to more resources and computation being required due to the oversampling process.

Machine learning is a subset of artificial intelligence, a powerful tool for classification and prediction problems. Machine learning (ML) techniques have been studied to address the one-bit massive MIMO channel estimation problem. Support vector machine (SVM) techniques can be applied to estimate massive MIMO channels with one-bit observations. Deep neural networks (DNN) have been studied as a potential way to address nonlinearity. The majority of work in the literature has focused on one-bit systems, and there have been only limited results presented for few-bit massive MIMO channel estimation. The Bussgang decomposition was exploited in to derive two linear channel estimators for few-bit ADCs including an extension of the BMMSE approach as well as a Bussgang-based weighted zero-forcing (BWZF) algorithm.

Data detection for low-resolution massive MIMO systems has also been studied intensively in the literature. Again, most of the results have been reported for the case of one-bit ADCs, though. In particular, a one-bit ML detector and a one-bit sphere decoding (OSD) technique have been proposed. The very high computational complexity of the ML and OSD methods nevertheless make them impractical for large-scale systems, though. A near-ML (nML) data detection method for large-scale MIMO systems has been proposed. However, the nML method is not robust at high signal-to-noise ratios (SNRs) when CSI is not perfectly known.

A solution that offers reduced hardware cost and power consumption while addressing the nonlinearity issue in few-bit MIMO systems would be of great benefit.

SUMMARY

According to embodiments of the inventive approach, methods and systems are provided to address the nonlinearity issue in few-bit MIMO systemsthrough the implementation of channel estimation and data detection networks. In an embodiment, DNN is used to optimize the nonlinear channel estimator and the training signal or matrix. Input signals enter a transmitter filter, becoming a transmitted signal before being propagated through a MIMO channel with noise added to the transmitted signal. With the transmitted signal becoming a receiver input after going through the MIMO channel, the receiver signal enters a receiver filter to generate an observed signal. Taken over many times, it becomes possible to estimate the MIMO channel given the observed signal.

The input signal comes from either a K-antenna mobile station or K single-antenna mobile stations. The former is for single user MIMO and the latter is for multiuser MIMO.

The transmitter filter can be a linear or non-linear filter. Hardware impairments at the transmitter, such as non-linear power amplifiers, may introduce non-linear distortions to the input signal.

The receiver filter may also be linear or non-linear. Hardware impairments at the receiver, like a low-resolution (i.e., 1-3 bits) analog-to-digital converters, may introduce non-linear distortions to the receiver input.

The input signal is a training signal or matrix. During a training phase, a known training sequence is sent from the transmitter, which may be piloted from a multitude of antennas. A specialized first layer of the autoencoder represents the training matrix.

The estimator of the MIMO channel is based on the observed signal.

An autoencoder is able, over time, to determine the nonlinear MMSE channel estimator and training matrix concurrently using DNN to better optimize both.

The autoencoder comprises two parts, the first of which comprises three layers. A noiseless layer is the first of the three layers. A model of the first part of autoencoder is represented by the following equation: y=hT+n, with y being the observed signal, n being the additive noise, T being the training matrix, and h being the channel estimator or MIMO channel. The noiseless layer determines the value of hT. The noiseless layer is neither a convolutional layer nor a fully connected layer. A noise layer is the second of the three layers. This layer is used to determine n. A non-linear layer, also known as a quantization layer, is the third of the three layers. This layer is implementable with non-linear models in the transmitter and receiver. One or both layers can be absent from the autoencoder. The receive layer receives the signal, after which the signal is propagated through a set of hidden layers. The output from the set of hidden layers is an estimate of the MIMO channel.

The signal that enters the autoencoder may be generated from a multitude of channel models, including but not limited to, Rayleigh fading, Rician fading, Nakagami fading, keyhole fading, and the geometric model with few transmission paths like in millimeter-wave channels.

At the noise layer where the noise is added, various types of noise can be added, including but not limited to, Gaussian noise, Laplacian noise, and impulsive noise.

Any non-linear layer can be implemented with non-linear models in the transmitter and receiver filters. Such layers can be omitted from the autoencoder, with the result being a linear MIMO system.

The autoencoder can be implemented with a variety of computer programs, including but not limited to MATLAB, Python, C, or any programming language meant for handling algorithms and signal processing.

The present teachings also include a computer program comprising non-transitory computer executable code in a non-transitory computer readable medium that, when executing on one or more computing devices (e.g. laptop, iPad, desktop, or any other device that handles computer code), performs the steps of: sending an input to a transmitter filter, transforming the input into a transmitted signal via the transmitter filter, directing the transmitter signal through a MIMO channel, adding noise and interference to the transmitted signal to create a receiver input, sending the receiver input to a receiver filter, yielding an observed signal.

The present teachings also include a system comprising: a computing device including a network interface for communications over a data network for sending a training sequence and using deep neural networks for channel estimation: a signal engine having a processor and a memory, the signal engine including a network interface for communications over the data network, the signal engine configured to initiate an algorithm that sends an input to a transmitter filter, transforms the input into a transmitted signal via the transmitter filter, directs the transmitter signal through a MIMO channel, adds noise and interference to the transmitted signal to create a receiver input, and sends the receiver input to a receiver filter, yielding an observed signal.

In another embodiment, the system comprises a channel estimation network and a first data detection network and a second data detection network. The channel estimation network is based on a reformulation of a machine channel estimation problem, the reformulation exploited by approximating the cumulative distribution function of a normal random variable as a Sigmoid activation function. With the channel estimation network, the pilot signal matrix is directly integrated in the weight matrices of the estimation network. When the pilot matrix is not given, it can be treated as additional trainable parameters and therefore training the channel estimation network is equivalent to jointly optimizing both the channel estimator at the base station and the pilot signal transmitted from the users. The first data detection network is based on a linearized system model obtained through the Bussgang decomposition. The second data detection network is based on a quantized system model. The special structure of second data detection network is also obtained through a reformulated ML data detection problem that parallels the reformulated channel estimation problem.

The channel estimation network functions by a layer receiving a channel estimation input. There may be multiple layers. The final layer outputs a channel estimation output of the same size as the channel estimation input, with the input being the size of 2NK elements, where N is the number of antenna base stations and K is the number of single antenna users.

The first data detection network functions by a layer receiving a first data detection input. There may also be multiple layers. The final layer outputs a first data detection output of the same size as the first data detection input, with the input being the size of 2K elements, K being the number of single antenna users.

The second data detection network functions by a layer receiving a second data detection input. There may also be multiple layers. The final layer outputs a second data detection output of the same size as the second data detection input, with the input being the size of 2K elements, K being the number of single antenna users.

Each layer of the channel estimation network has at least one weight matrix and at least one bias vector. In an embodiment, there are two weight matrices and two bias vectors. In all embodiments, the pilot matrix P plays the role of the weight matrices and the received signals $q^{up}$ and $q^{low}$ play the role of the bias vectors.

Trainable parameters of the channel estimation network are step size, and a scaling parameter inside the Sigmoid activation function.

Trainable parameters of the first data detection network are step size and a scaling parameter in the projector function.

Trainable parameters of the second data detection network are step size, a project function scaling parameter, and a scaling parameter for the Sigmoid activation function.

The present teachings also include a computer program product that can execute the steps of a channel estimation layer receiving an input and another layer outputting an output, with the size of the input the same as that of the output, i.e. 2NK elements, with N being the number of antenna base stations and K being the number of single antenna users. In this embodiment, there may be multiple layers.

There may be a first data detection network. The computer program product executes further steps of a layer receiving an input, and another layer outputting an output, the size of the input and output being the same, with the size being 2K elements, with K being the number of single antenna users.

A second data detection network may also be included in the computer program product, able to execute the steps of a layer receiving an input and another layer outputting an output. The sizes of the input and output are the same, being 2K elements, with K being the number of single antenna users.

The present teaching also includes a system that comprises a computing device including a network interface for communications over a data network for designing a channel estimation network. The system may handle a channel estimation layer receiving an input, with another layer outputting an output. The size of the input and output are the same, with the size being 2NK elements, with N being the number of antenna base stations and K being the number of single antenna users.

The system may further comprise a first data detection network. A layer receives and input and another layer outputs an output, with the input and the output being the same size, namely 2K elements.

The system may even further comprise a second data detection network. Similar to the first data detection network, a layer receives an input while another layer outputs an output. The size of the input and the output are the same: 2K elements.

These and other features, aspects and advantages of the present teachings will become better understood with reference to the following description, examples, and appended claims.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein

FIGS. 10A and 10B depict project functions with QPSK signaling and 16QAM signaling, respectively.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. Where a term is provided in the singular, the plural of that term is also contemplated. To provide a clarifying example, when an object is described, unless that object is expressly described as "a single object", "one or more object", "at least one object", or multiple objects also falls within the meaning of the term. Other technical terms used herein have their ordinary meaning in the art that they are used, as exemplified by a variety of technical dictionaries.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

Figure 1:
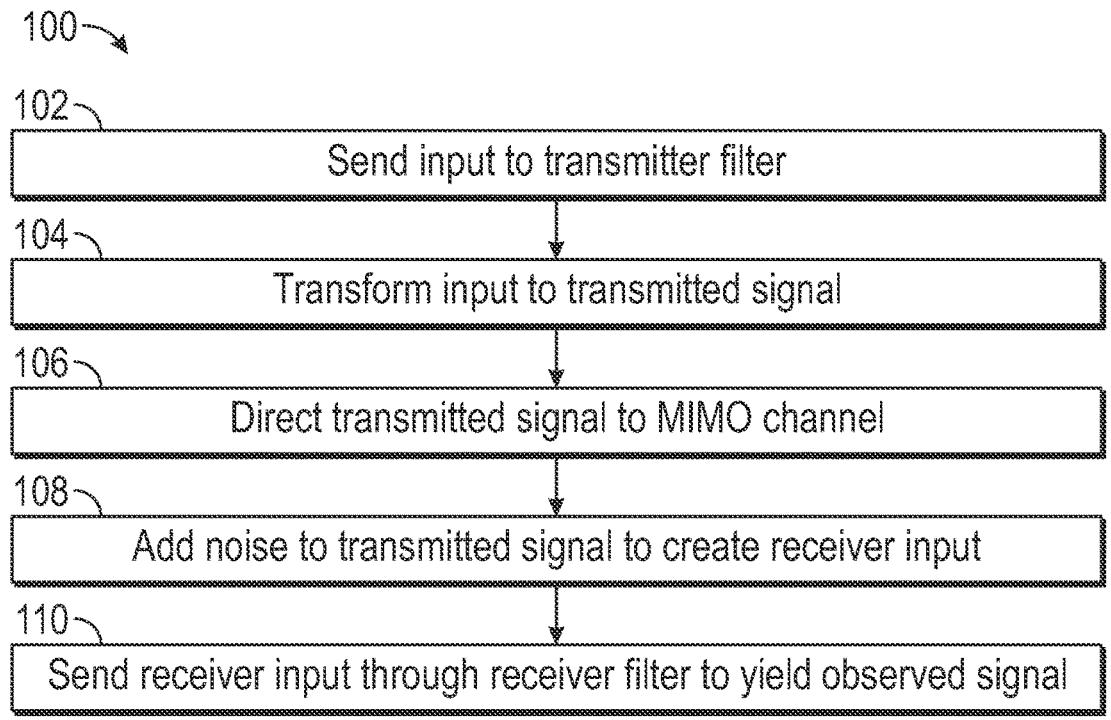
FIG. 1 is a flow chart of a method for sending a training sequence.

FIG. 1 is a flow chart of an exemplary method for sending a training sequence and using DNN for channel estimation. In general, the method 100 may involve an input going through a process of filtering and noise addition to generate an observed signal. The goal of the processing is to better model channel estimation for non-linear systems. It will be readily apparent to those in the art that multiple inputs may be provided, with each input being processed according to the described steps.

As shown in step 102, the method 100 may include sending an input to a transmitter filter. The inputs may come from multiple data streams, with the inputs coming from either a K antenna mobile station or K single antenna mobile stations.

As shown in step 104, the method 100 may include transforming the input into a transmitted signal once it goes through the transmitter filter. The transmitter filter may be a linear or non-linear filter, with hardware impairments such as non-linear power amplifiers introducing non-liner distortion to the input.

As shown in step 106, the method 100 may include directing the transmitted signal to a MIMO channel. Over time, the goal is to minimize the mean square error (i.e. the error signified by the difference between the MIMO channel approximation and the MIMO channel), also known as MMSE, or minimum mean squared error.

As shown in step 108, the method 100 may include adding noise to the transmitted signal at an antenna base station. The noise is often modeled as a zero-mean Gaussian distributed with a covariance matrix. Once noise is added to the transmitted signal, it becomes a receiver input.

As shown in step 110, the method 100 may include sending the receiver input into the receiver filter, after which it is an observed signal. The receiver filter may be a linear or non-linear filter, with hardware impairments like analog-to-digital converters at the receiver filter.

Figure 2:
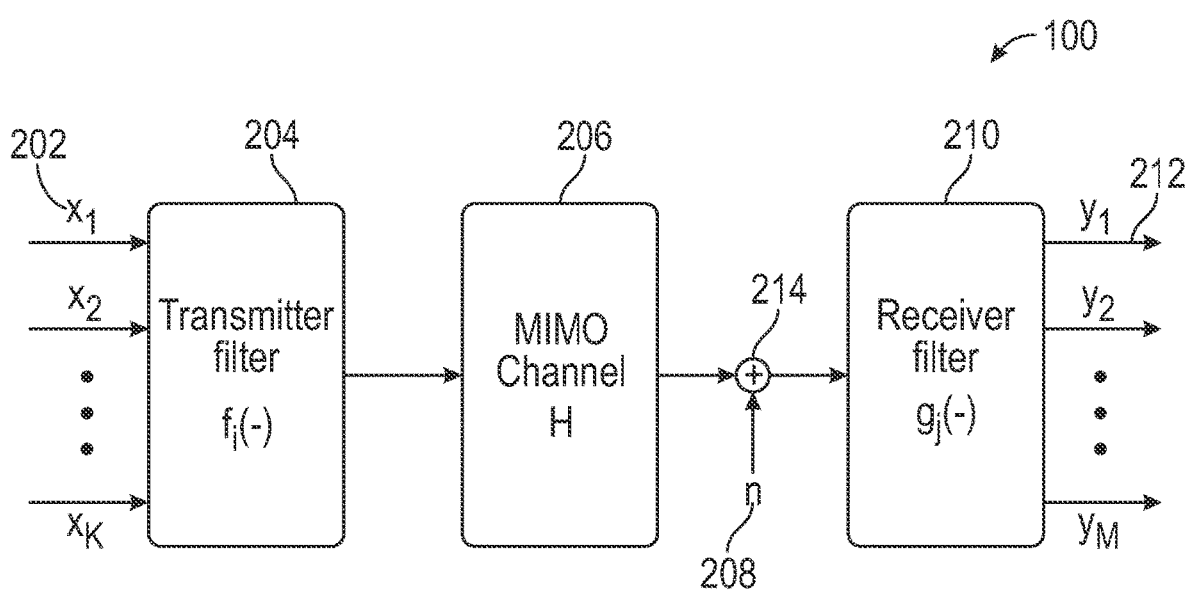
FIG. 2 depicts a MIMO system with nonlinear components.

FIG. 2 depicts a MIMO system with nonlinear components. The input 202, transmitter filter 204, MIMO channel 206, noise 208, receiver filter 210, and observed signal 212 are all identifiable. The antenna station 214 where the noise 208 is added is also shown. Multiple input 202 are possible (as shown from 1 . . . K), as are multiple observed signals 212 (as shown from 1 . . . M).

Figure 3:
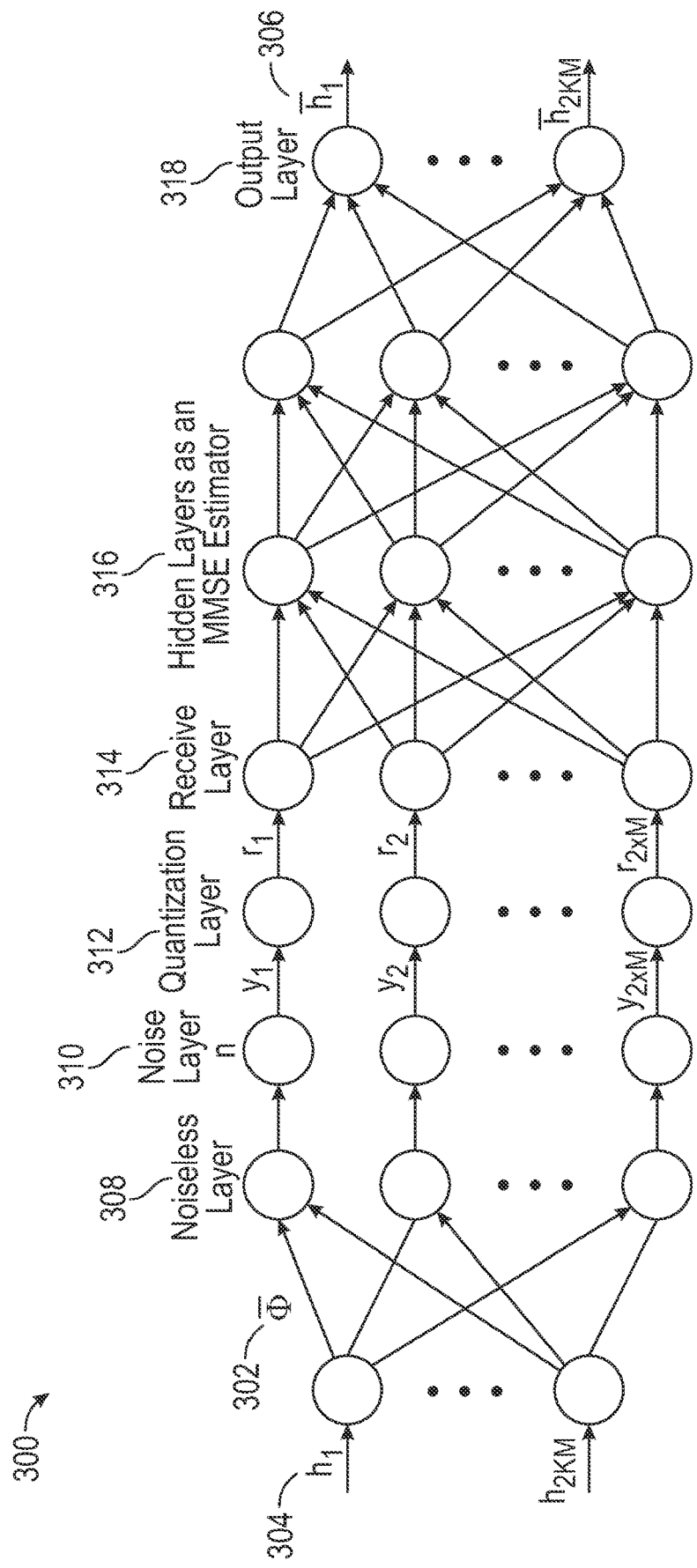
FIG. 3 shows an autoencoder for optimizing the training matrix and the non-linear minimum mean square error estimator.

FIG. 3 depicts an autoencoder 300 for optimizing the training matrix and the non-linear minimum mean square error (MMSE) channel estimator. The goal of the autoencoder 300 is to optimize the training signal 302. The MIMO channel 304 is the input and the channel approximation 306 is the output. The noiseless layer 308, noise layer 310, and quantization layer 312 make up the first part of the autoencoder 300. The multiplication of training signal 302 and the MIMO channel 304 is carried out at the noiseless layer 308. Noise is generated at the noise layer 310 and is added to the multiplication of the training signal 302 and the MIMO channel 304. The quantization layer 312 performs element-wise quantization on the signal coming from the noise layer 310. After leaving the receiver layer, the signal enters a set of hidden layers 316. The set of hidden layers 316 acts as a nonlinear MMSE channel estimator, allowing a large data set to be generated based on the signal that enters the set of hidden layers 316 and what exits the output layer 318. The channel approximation 306 and the MIMO channel 304 are meant to be minimized. Rectified Linear Unit (ReLU) functions and Tanh activation function may be used with the hidden layers.

Figure 4A:
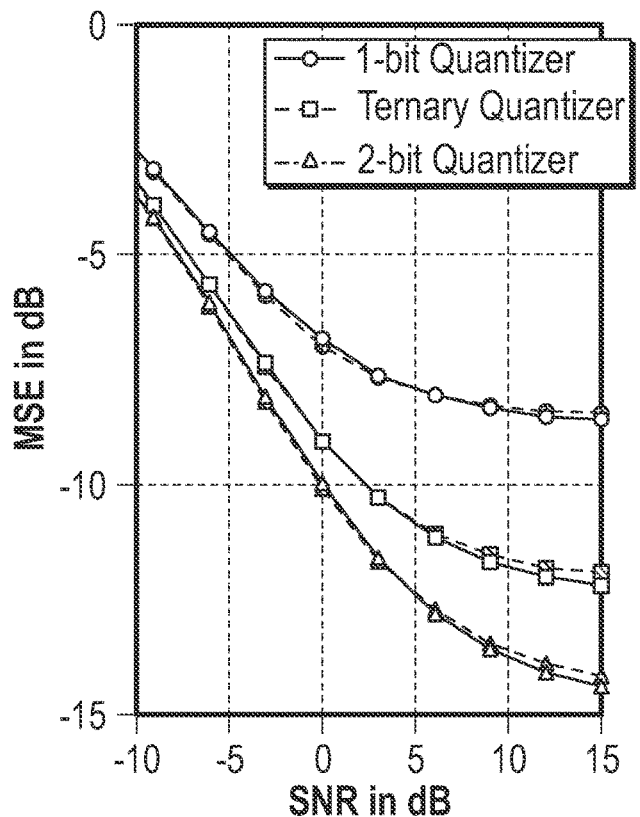
FIGS. 4A and 4B depict the mean square error in estimating independent and individually distributed Gaussian channel coefficients over two different training time.
Figure 4B:
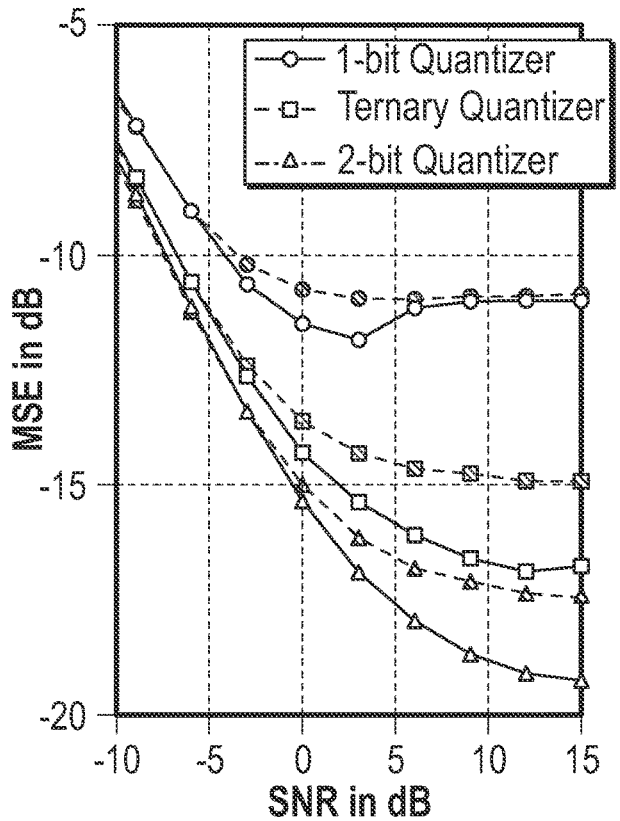

FIGS. 4A and 4B depict the mean square error in estimating independent and individually distributed Gaussian channel coefficients over training times of 16 and 64 symbols per user, respectively. In this instance, the number of users is four. This number is intended to be illustrative only.

It will be readily apparent to those of skill in the art that different numbers of users may be involved according to the described approach. At a training time of 16, regardless of the type of quantizer used at the quantization layer, the autoencoder (solid lines) performed as well as the Bussgang-based linear minimum mean-squared error (BLMMSE) channel estimator (dashed lines). While a BLMMSE channel estimator is not ideal since the quantized observation is not Gaussian, in this instance, this type of channel estimator works for short training times. At the 64 training time, though, the autoencoder, regardless of quantizer, provided lower mean square errors (x-axis) as signal-to-noise ratio (SNR) increased (y-axis).

Figure 5A:
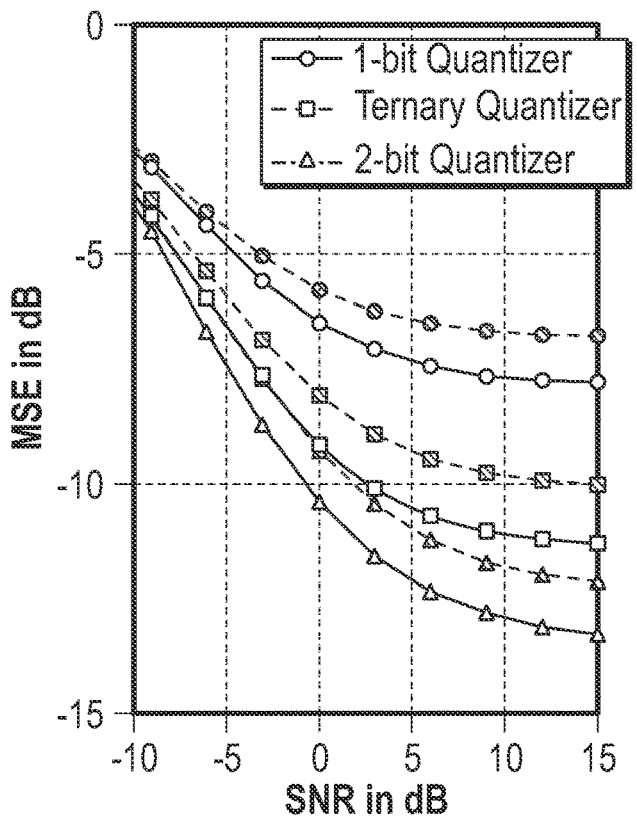
FIGS. 5A and 5B illustrate the mean square error in estimating independent and individually distributed light-of-sight channel coefficient with two different training time.
Figure 5B:
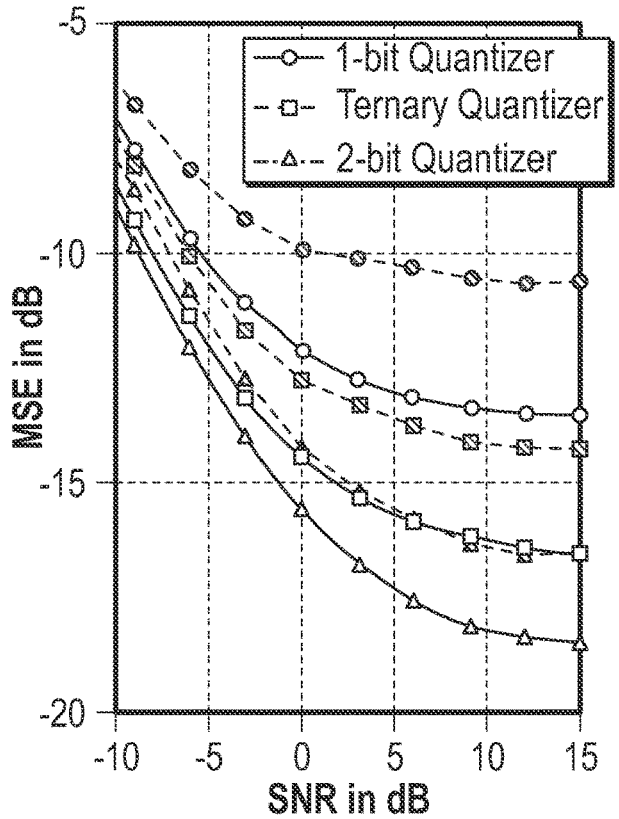

FIGS. 5A and 5B illustrate the mean square error in estimating independent and individually distributed light-of-sight channel coefficient with training times of 16 and 64 symbols per user, respectively. In this instance, for purposes of illustration, the number of users is eight. At both training times, regardless of quantizer, the autoencoder generated lower mean square errors as SNR increased, outperforming the BLMMSE channel estimator.

Figure 6:
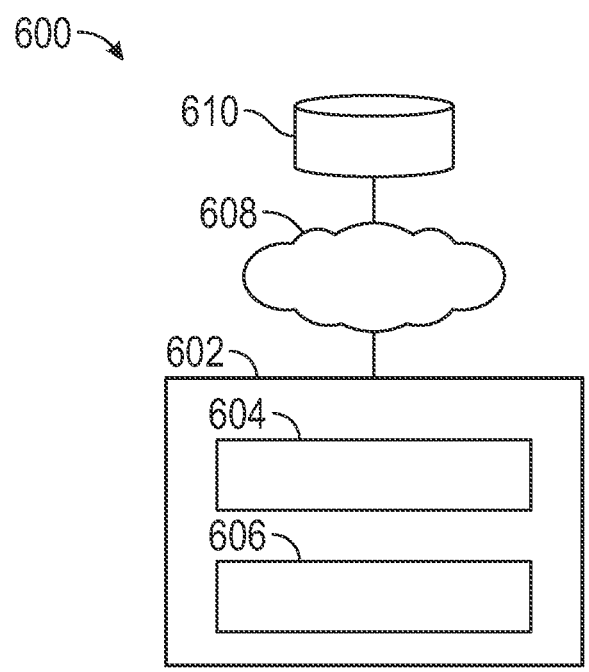
FIG. 6 is a computing environment for sending a training sequence and using deep neural networks for channel estimation.

FIG. 6 is a computing environment 600 for sending a training sequence and using DNN for channel estimation. Device 602 can include: user interface (UI) 604 (e.g., a monitor or touch screen of a mobile device or computer) and program 606. A network 608 can connect program 606 to a database 610 via internet connection or any telecommunication. The database 610 stores information generated by the autoencoder. In addition, a custom integrated-circuit solution for computing (i.e., for sending a training sequence and using DNN for channel estimation), such as an integrated electronics chip, may serve as the program 606.

Figure 7:
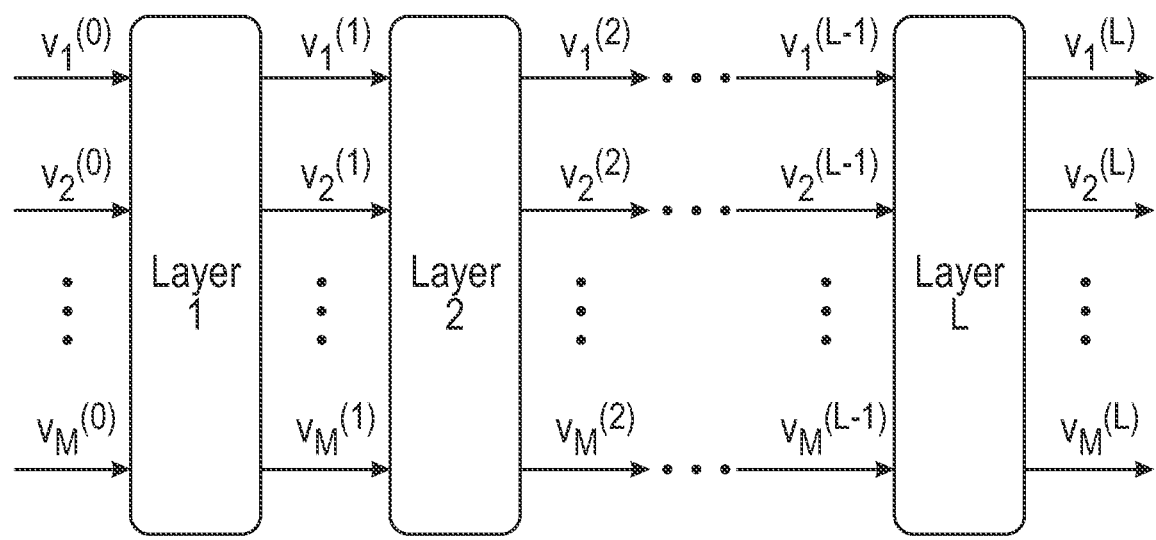
FIG. 7 is a depiction of a channel estimation network, a first data detection network and a second data detection network
Figure 8A:
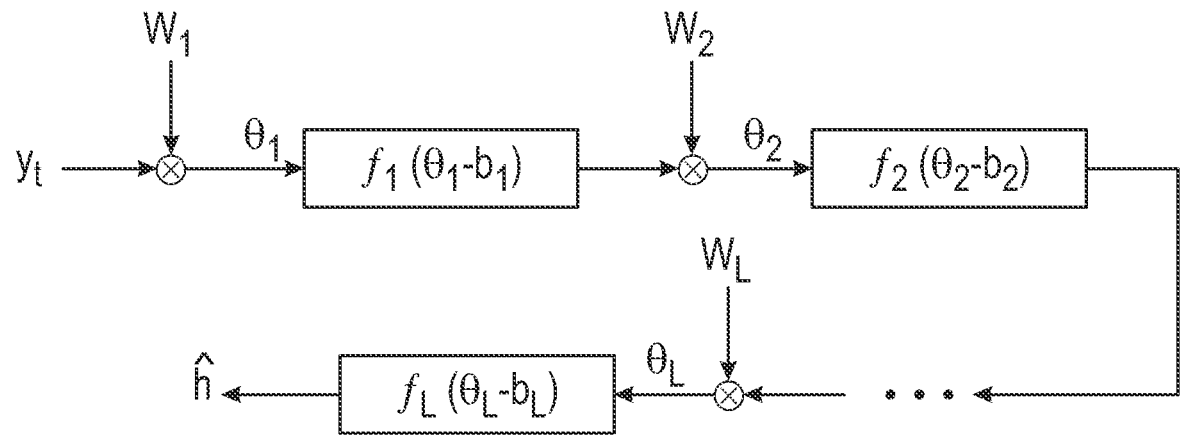
FIGS. 8A and 8B depict a conventional channel estimator and a channel estimator according to an embodiment of the present invention, respectively.
Figure 8B:
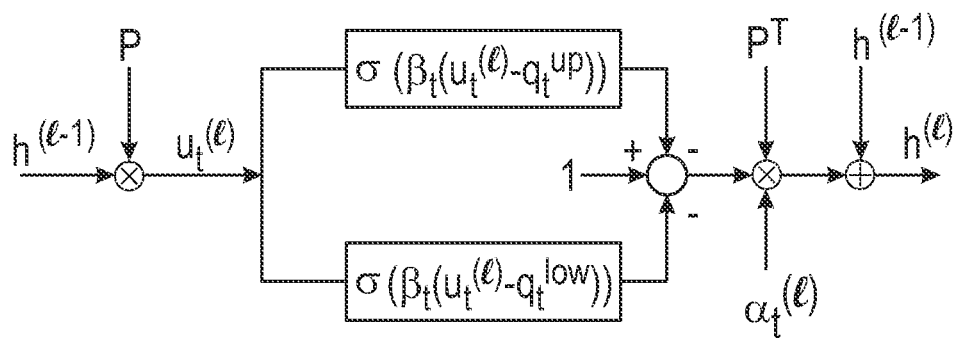
Figure 9B:
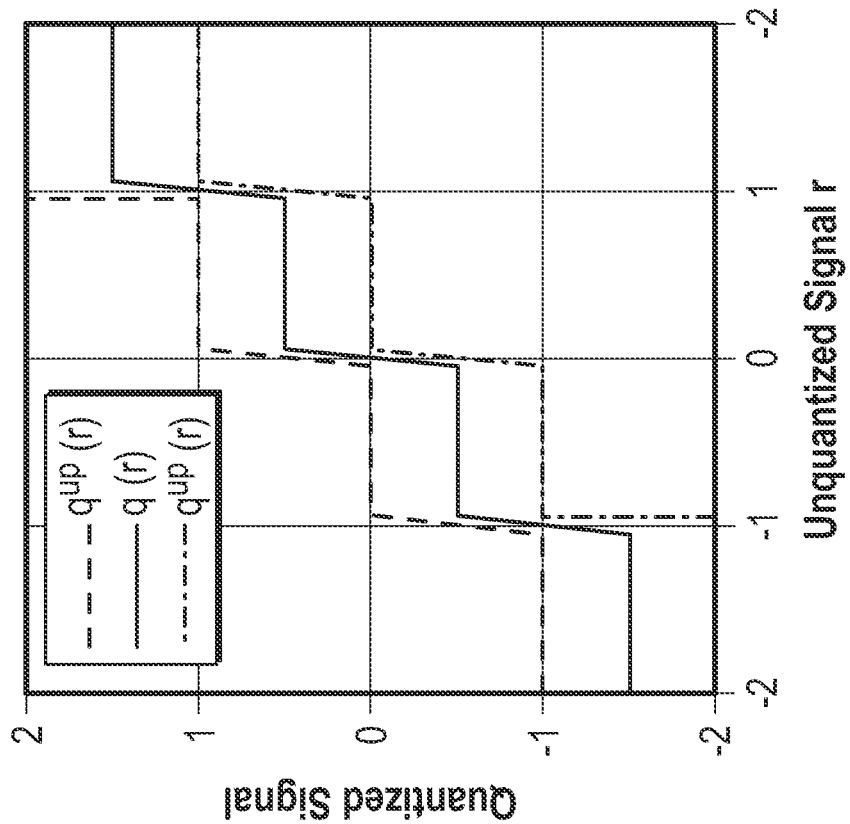
FIGS. 9A and 9B depict a two-bit soft quantizer with differing constants.
Figure 9A:
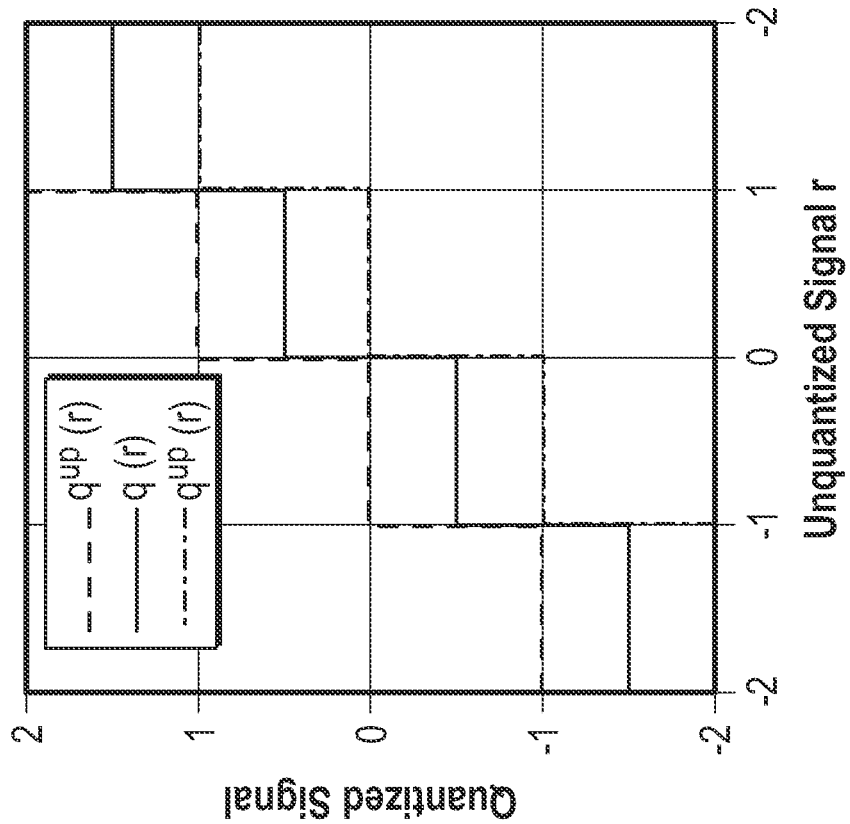

FIG. 7 is a depiction of an embodiment of the channel estimator network, a first and a second data detection network. With regard to the channel estimator network, each of the L layers takes a vector of 2NK elements as the input and generates an output vector of the same size. FIG. 8B depicts the specific structure for each layer C. Each layer of the channel estimator network comprises two weight matrices and two bias vectors where the pilot matrix P plays the role of the weight matrices and the received signals $q_t^{up}$ and $q_t^{low}$ play the role of the bias vectors. In the event that the pilot matrix is not given, it may be treated as additional trainable parameters. Training the channel estimator network is equivalent to jointly optimizing both the channel estimator at the base station and the pilot signal transmitted from users. This feature improves on prior art, which is typically designed only for a known pilot matrix, making it unable to convey information about the optimal pilot signal. In contrast to the channel estimator shown in FIG. 8B, the channel estimator of FIG. 8A is a conventional DNN-based channel estimator, with each layer 1 containing one weight matrix $W_t$ and one bias vector bt. The channel estimator network of FIG. 8B has a Sigmoid activation function $\sigma(\cdot)$, which is not arbitrary. The activation function of conventional DNN structures $\{f_t(\cdot)\}$ are determined heuristically by experiments. For a given pilot matrix P, the trainable parameters in the channel estimator network are the step sizes $\{a_t(l)\}$ and a scaling parameter $\beta_t$ inside the Sigmoid function. With $\hat{h}$ denoting a channel estimate, it is the output of the last layer of the channel estimator network (i.e. $\hat{h}=h^{(L)}$). With the pilot matrix P given, a training sample may comprise the pilot matrix P, a channel vector realization h and a noise vector z, which may be randomly generated. When the pilot matrix P is not given, the training sample only comprises h and z. The received signals $q_t^{up}$ and $q_t^{low}$ depend on the pilot matrix. If the pilot matrix is trainable, gradient back propagation during the training process should go through $q_t^{up}$ and $q_t^{low}$. Low-resolution ADCs are discontinuous functions, though, which makes gradient back propagation infeasible. A soft quantizer model based on the Rectified Linear Unit (ReLU) activation function $f_{relu}(r) = \max(0,r)$ overcomes this issue. The soft quantizer model is depicted as follows:

$$q^{up}(r) = q(r) + \frac{\Delta}{2} + c_2[f_{relu}(r - B\Delta + c_1) - f_{relu}(r - B\Delta - c_1)] \quad (1)$$

$$q^{low}(r) = q(r) - \frac{\Delta}{2} - c_2[f_{relu}(-r - B\Delta + c_1) - f_{relu}(-r - B\Delta - c_1)] \quad (2)$$

with $B = 2^{b-1} - 1$, $c_1$ and $c_2$ are positive constants, and $$q(r) = -(2^b - 1)\frac{\Delta}{2} + \frac{\Delta}{2c1}\sum_{k=-B}^{B}[f_{relu}(r + i\Delta + c_1) - f_{relu}(r + i\Delta - c_1)], \quad (3)$$

with $\Delta$ being step size and r being the unquantized received signal vector, and b being the number of bits. FIG. 9A shows the effect of $c_1$, with smaller values of $c_1$ making the soft quantizer sharper, moving it closer to the hard quantizer. The constants $c_1$ and $c_2$ are not trainable parameters, as making them trainable may lead to large deviations between the soft and hard quantizers.

To further describe the channel estimator network, upper ($q_{t,i}^{up}$) and lower ($q_{t,i}^{low}$) quantization thresholds of the bin in which training data $y_{t,i}$ belongs are defined as $$q_{k,i}^{up} = \begin{cases} y_{l,s} + \frac{\Delta}{g} & \text{if } y_{l,s} < \tau_o - 1 \\ \infty & \text{otherwise,} \end{cases} \quad (4)$$

$$q_{l,s}^{low} = \begin{cases} y_{l,s} - \frac{\Delta}{g} & \text{if } y_{l,s} < \tau_1 \\ -\infty & \text{otherwise,} \end{cases}$$

with $\Delta$ being step size and t denotes a set of thresholds of up to $2^{b-1}$ thresholds, with b being the number of bits in the model. The channel estimator is defined as $$\hat{h}_{KL} = \arg\max_b f(y_b \mid h) \quad (5)$$

$$= \arg\max_b \sum_{t=1}^{2NT_c} \log[\Phi(q_{k,i}^{up}) - \Phi(q_{l,s}^{low})].$$

with $x_{s,t}^{up} = \sqrt{2p}(qt_i^{up} - p_i^T h)$ and $x_{s,t}^{low} = \sqrt{2p}(q_{t,s}^{low} - p_i^T h)$, p being the signal to noise ratio, h being the channel, $p_i^T$ being the transpose of the pilot training data, and $\phi$ signifying a cumulative distribution function. There are instances in which the estimated channel is inconsistent based on the cumulative distribution function. However, $\phi$ can be approximated by the Sigmoid function $\sigma$, with the absolute difference between the cumulative distribution function and the Sigmoid function being less than or equal to about 0.0095. Reformulating the channel estimator with this approximation yields a channel estimator of $$\hat{h}_{KL} = \arg\max_b \hat{P}_t(h) \quad (6)$$

with $\hat{P}_t(h)$ being $$\hat{P}_t(h) = \sum_{t=1}^{2NT_c} \log\left[\frac{1}{1 + e^{-q_{k,i}^{up}}} - \frac{1}{1 + e^{-q_{k,i}^{low}}}\right] = \quad (7)$$

$$\sum_{t=1}^{2NT_c} \left[\log\left(e^{-q_{k,i}^{low}} - e^{-q_{k,i}^{up}}\right) - \log\left(1 + e^{-q_{k,i}^{up}}\right) - \log\left(1 + e^{-q_{k,i}^{low}}\right)\right]$$

c being a constant equal to 1.702. An iterative gradient decent method may be used for the channel estimator, namely $$h^{(T)} = h^{(T-1)} + a_i^\infty \nabla(h^{R-1}) \quad (8)$$

$$\nabla \hat{P}_t(h) = \sum_{t=1}^{2NT_c} c\sqrt{2\mu} P_i \left(1 - \frac{1}{1 + e^{-q_{k,i}^{up}}} - \frac{1}{1 + e^{-q_{k,i}^{low}}}\right)$$

$$= \sqrt{2\mu} P^T[1 - \sigma(c\sqrt{2\mu} Ph - q_i^{up})] -$$

with $\sigma(c\sqrt{2\mu} Ph - q_i^{low}, q_t^{up} = [q_{t,1}^{up}, \ldots, q_{t,2NTt}^{up}]^T$, and $q_t^{low} = [q_{t,1}^{low}, \ldots, q_{t,2NTt}^{low}]^T$, 1 is the iteration index and $a_t^{(l)}$.

The first data detection network, based on the Bussgang decomposition, is based on the linearized system model $$y = VHx + Vz + d \quad (9)$$

$$= \Lambda x + n$$

$$V = \frac{\Delta}{\sqrt{n}} \text{diag}(\sum_T)^{-1k} \quad (10)$$

$$\sum_{t=1}^{Y-1} \exp\left\{-\Delta^2(i - 2^{\delta-\lambda})^2 \text{diag}(\sum_T)^{-1}\right\} \text{ and } \sum_T = \frac{1}{2}(HH^T + (N_0 I)).$$

and $\Sigma_k = 1/2(HH^T + N_0 I)$. In the case of 1-bit ADCs, the covariance of n is given as $$\sum_n = \frac{\Delta}{\pi}\left[\text{argmin}\left(\text{diag}\sum_T\right) - \frac{1}{2}\sum_T \text{diag}(\sum_T)^{-\frac{1}{2}}\right] - \quad (11)$$

$$\text{diag}(\sum_T)^{-\frac{1}{2}} + \frac{N_0}{2}\text{diag}(\sum_T)^{-1}\right]$$

For few-bit ADCs, the covariance of n can be approximated as $$\sum_n \infty \frac{N_0}{2} VV^T + n_0 \text{diag}(\sum_T).$$

Effective noise n is often modeled as $N(0, \Sigma_n)$. As the effective noise n is assumed to be Gaussian, the Bussgang-based maximum likelihood detection problem is given as $$X_{BX} = \arg\min_{N^n}(y - Ax)^T \sum_n^{-1}(y - Ax). \quad (12)$$

With $P_B(x)$ being the objective function of Equation (12), an iterative projected gradient descent method $$x^{(\ell)} = \psi_r(x^{(\ell-1)} - x^{(\ell)}\nabla Px(x^{(\ell-3)})) \quad (13)$$

may be applied to search for the optimal solution. The gradient of $P_B(x)$ evaluated at $x^{(l-1)}$ is given by $$\nabla Px(x^{(l-1)}) = -2A^T \sum_n^{-1} (y - Ax^{(l-1)}) \quad (14)$$

with $\psi(\cdot)$ characterized by the positive parameter $t_l$, is a non-linear projector that forces the signal to the nearest constellation point. $\psi(\cdot)$ may be written as $$b_n(x) = -(2^2 - 1)\frac{\Delta}{2} + \frac{\Delta}{2n} \sum_{t=-B}^{B} [f(r + t\Delta + t_g) - f(r + t\Delta - x] \quad (15)$$

where $B' = 2^{b'-1} - 1$. For QPSK signaling, $$\{b', \Delta'\} = \left\{1, \frac{2}{\sqrt{2}}\right\}$$

and for 16-QAM signaling $$\{b', \Delta'\} = \left\{2, \frac{2}{\sqrt{10}}\right\}$$

The effect of $t_l$ on $\psi(\cdot)$ is shown in FIGS. 10A and 10B. As $t_l$ decreases, the projection gets sharper.

Figure 11:
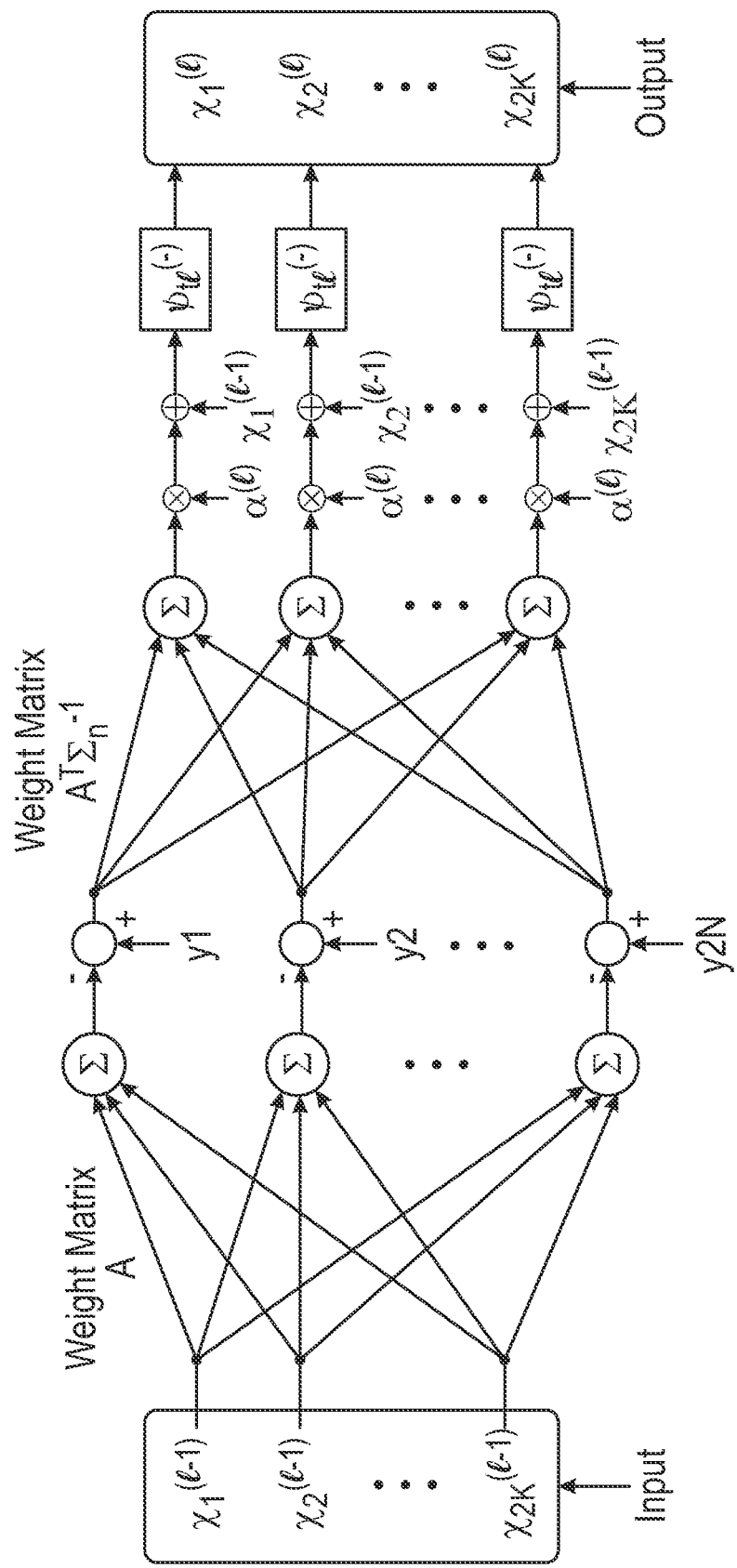
FIG. 11 depicts an embodiment of the channel estimator network.

The first data detection network is created by unfolding the projected gradient descent in equation (13). The specific layer structure of the first data detection network is shown in FIG. 7. Each L layer takes an input vector of size 2K and generates an output vector of the same size. The specific layer structure of the first data detection network is shown in FIG. 11 where A and $A^T \Sigma_n^{-1}$ play the role of weight matrices. The received signal vector y is seen to be the bias vector. The only trainable parameters in layer l of the first data detection network are the step size $a^{(l)}$ and the scaling parameter $t_l$ in the projector function $\psi_{t_l}(\cdot)$.

The second data detection network is based on a quantized system model, with its structure obtained through a reformulated machine learning data detection problem that parallels a reformulated channel estimation problem. The machine learning data detection problem is defined as $$X_{BL} = \arg \max_{xM^n} \sum_{t=1}^{LN} \log[\Phi(q_i^{up}) - \Phi(q_i^{low})] \quad (16)$$

with $s_i^{up} = \sqrt{2\rho}(q_i^{up} - h_i^T x)$ and $s_i^{low} = \sqrt{2\rho}(q_i^{low} - h_i^T x)$ and $$q_i^{up} = \begin{cases} y_2 + \frac{\Delta}{2} & \text{if } y_x < t g_{b-1} \\ \infty & \text{otherwise,} \end{cases} \quad (17)$$

$$q_i^{low} = \begin{cases} y_2 - \frac{\Delta}{2} & \text{if } y_x < \tau_2 \\ -\infty & \text{otherwise.} \end{cases}$$

$q_i^{up}$ and $q_i^{low}$ are upper and lower quantization thresholds of the bin to which $y_i$ belongs. With $P(x)$ denoting the objective function of equation (16), it is difficult to obtain an exact solution for $P(x)$, so an approximation is necessary. The approximation of $P(x)$ is $$P_t(x) \approx \hat{P}_t(x) = \sum_{t=1}^{BN} \log\left[\frac{1}{1 + e^{-q_{k,i}^{up}}} - \frac{1}{1 + e^{-q_{k,i}^{low}}}\right] = \sum_{t=1}^{BN} \left[\log\left(e^{-q_i^{low}} - e^{-q_i^{up}}\right) - \log\left(1 + e^{-q_i^{up}}\right) - \log\left(1 + e^{-q_i^{low}}\right)\right] \quad (18)$$

With the approximation the $P(x)$, the reformulated machine learning data detection problem becomes $$X = \arg \max_{x \in M^K} \hat{P}(x) \quad (19)$$

And the gradient of the approximation of $P(x)$ is $$\nabla \hat{P}_t(x) = \sum_{t=1}^{2N} c\sqrt{2\mu} b_i \left(1 - \frac{1}{1 + e^{-q_{k,i}^{up}}} - \frac{1}{1 + e^{-q_{k,i}^{low}}}\right) \quad (20)$$

$$= \sqrt{2\mu} P^T [1 - \sigma(c\sqrt{2\mu}(Hx - q_i^{up})) - \sigma(c\sqrt{2\mu}(Hx - q_i^{up}))]$$

with $q^{up} = [q_1^{up}, \ldots, q_{2N}^{up}]^T$ and $q^{low} = [q_1^{low}, \ldots, q_{2N}^{low}]^T$. An iterative projected gradient decent method for solving (19) may be written as $$x^{(l)} = \psi_l(x^{(l-1)} + a^{(l)} \nabla V(x^{(l-3)})) \quad (21)$$

with l being the iteration index and $a^{(l)}$ being a step size.

Figure 12:
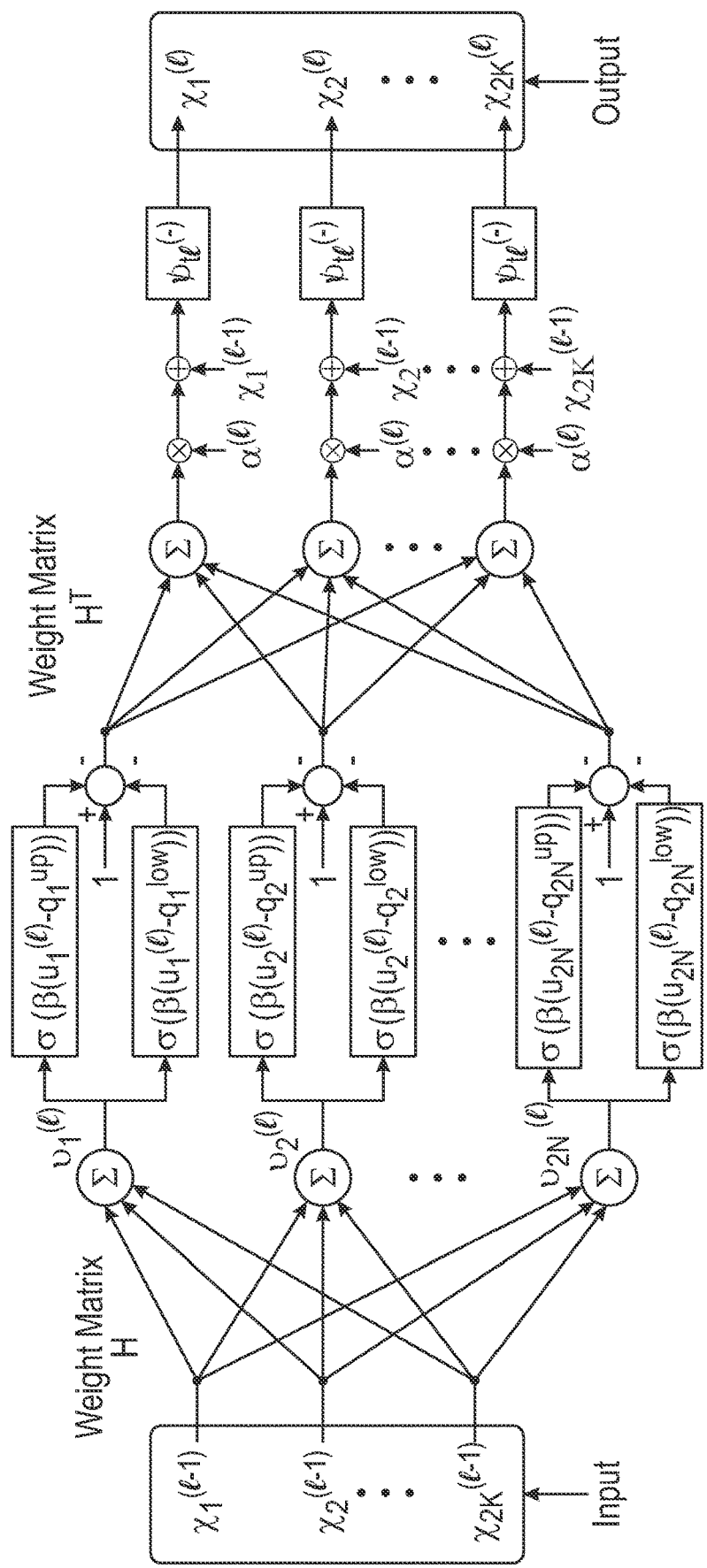
FIG. 12 depicts an embodiment of a data detection network.

Similar to the first data detection network, each layer of the second data detection network takes a vector of 2K elements as the input, generating an output vector of the same size, as seen in FIG. 7. The structure of the second data detection network is shown in FIG. 12. Each layer has two weight matrices H and $H^T$ and two bias vectors $q^{up}$ and $q^{low}$ defined by the channel and received signal, respectively. The activation function is the Sigmoid function $\sigma(\cdot)$. The learning process for each layer involves upconverting the signal $x^{(l-1)}$ from 2K to 2N using a non-trainable weight matrix H, applying the activation function, and downconverting the signal back to 2K using weight matrix $H^T$. The function $\psi_{t_l}(\cdot)$ is then implemented to project $x^{(l-1)}$ onto a discrete set $M^K$. The training parameters for the second data detection network are step sizes $\{a^{(l)}\}$, scaling parameters $\{t_l\}$ for the projector and scaling parameter $\beta$ for the Sigmoid function.

The first data detection network is based on a linearized system model obtained through the Bussgang decomposition. The second data detection network is based on a quantized system model. Both are adaptive to the channel since the weight matrices and the bias vectors are defined by the channel matrix and the received signal vector, respectively.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings.

The systems and methods disclosed herein may be implemented via one or more components, systems, servers, appliances, other subcomponents, or distributed between such elements. When implemented as a system, such systems may include an/or involve, inter alia, components such as software modules, general-purpose CPU, RAM, etc., found in general-purpose computers. In implementations where the innovations reside on a server, such a server may include or involve components such as CPU, RAM, etc., such as those found in general-purpose computers.

Additionally, the systems and methods herein may be achieved via implementations with disparate or entirely different software, hardware and/or firmware components, beyond that set forth above. With regard to such other components (e.g., software, processing components, etc.) and/or computer-readable media associated with or embodying the present implementations, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the systems and methods may be achieved via or performed by logic and/or logic instructions including program modules, executed in association with such components or circuitry, for example. In general, program modules may include routines, programs, objects, components, data structures, etc., that perform particular tasks or implement particular instructions herein. The embodiments may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, where media of any type herein does not include transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the implementations described herein or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the implementations herein, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application.

Moreover, the above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

EXAMPLES

Aspects of the present teachings may be further understood in light of the following examples, which should not be construed as limiting the scope of the present teachings in any way.

Example 1—Numerical Results Comparing Channel Estimation Methods

Figure 13:
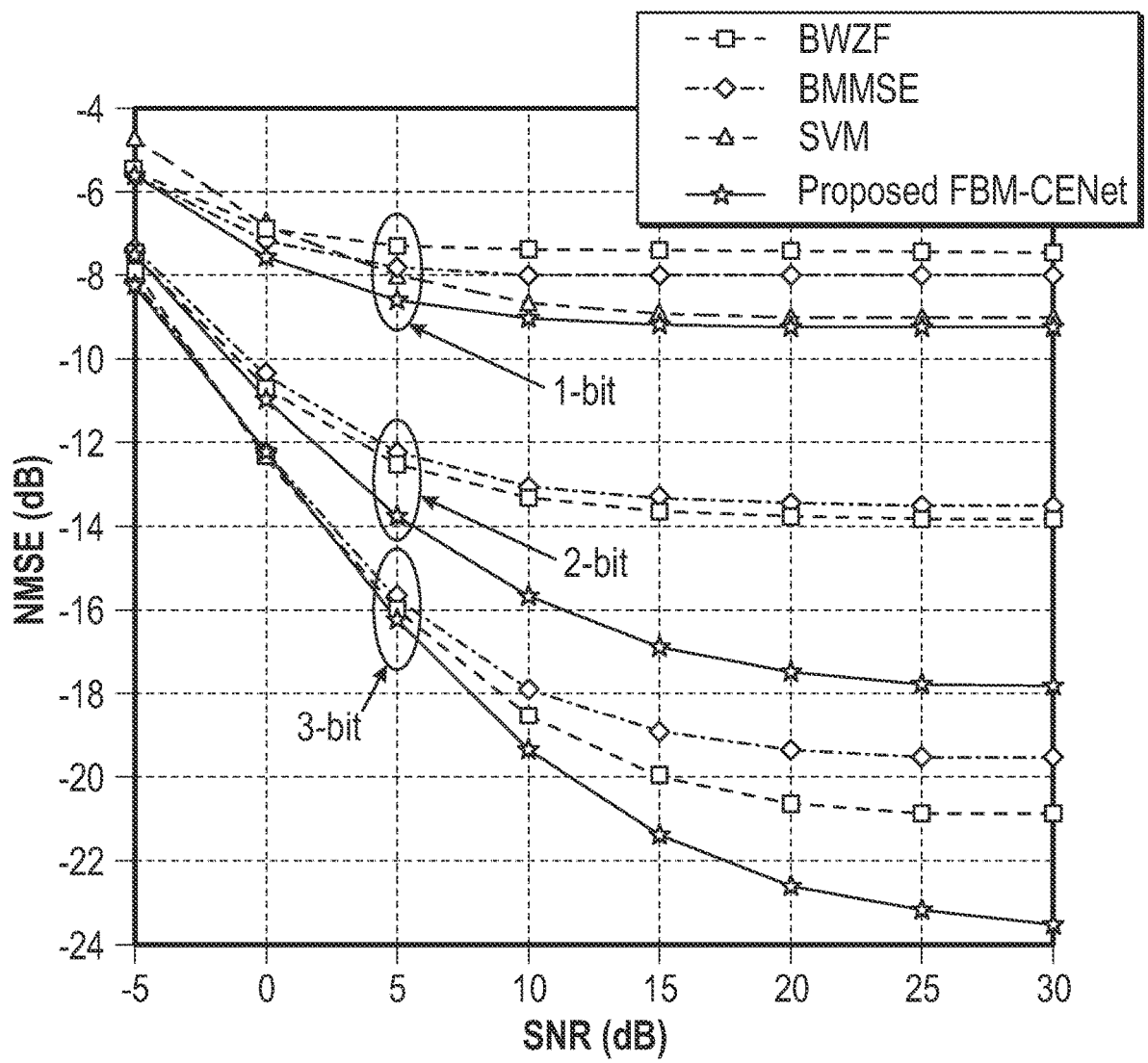
FIG. 13 depicts a channel estimation performance comparison.

FIG. 13 shows channel estimation performance of the channel estimation network (denoted as FBM-CENet) in comparison with other channel estimation methods for a given pilot matrix P. 1 bit, 2 bit, and 3 bit ADCs are used for the comparison. The channel estimation methods are compared based on normal mean square error as a function of signal noise ratio (SNR). For the 1-bit ADCs, it is observed that the channel estimator network slightly outperforms the support-vector machine (SVM)-based method at medium-to-high SNRs. At low SNRs, though, the performance gap between the channel estimator network and the SVM method is larger. The SVM method is specifically for 1-bit ADCs, so the fact that the channel estimator network outperforms SVM method is of significance. As SNR increases, the performance gap between the channel estimator network and the Bussgang-based weighted zero-forcing (BWZF) and Bussgang-based minimum mean-squared error (BMMSE) methods increases.

Figure 14:
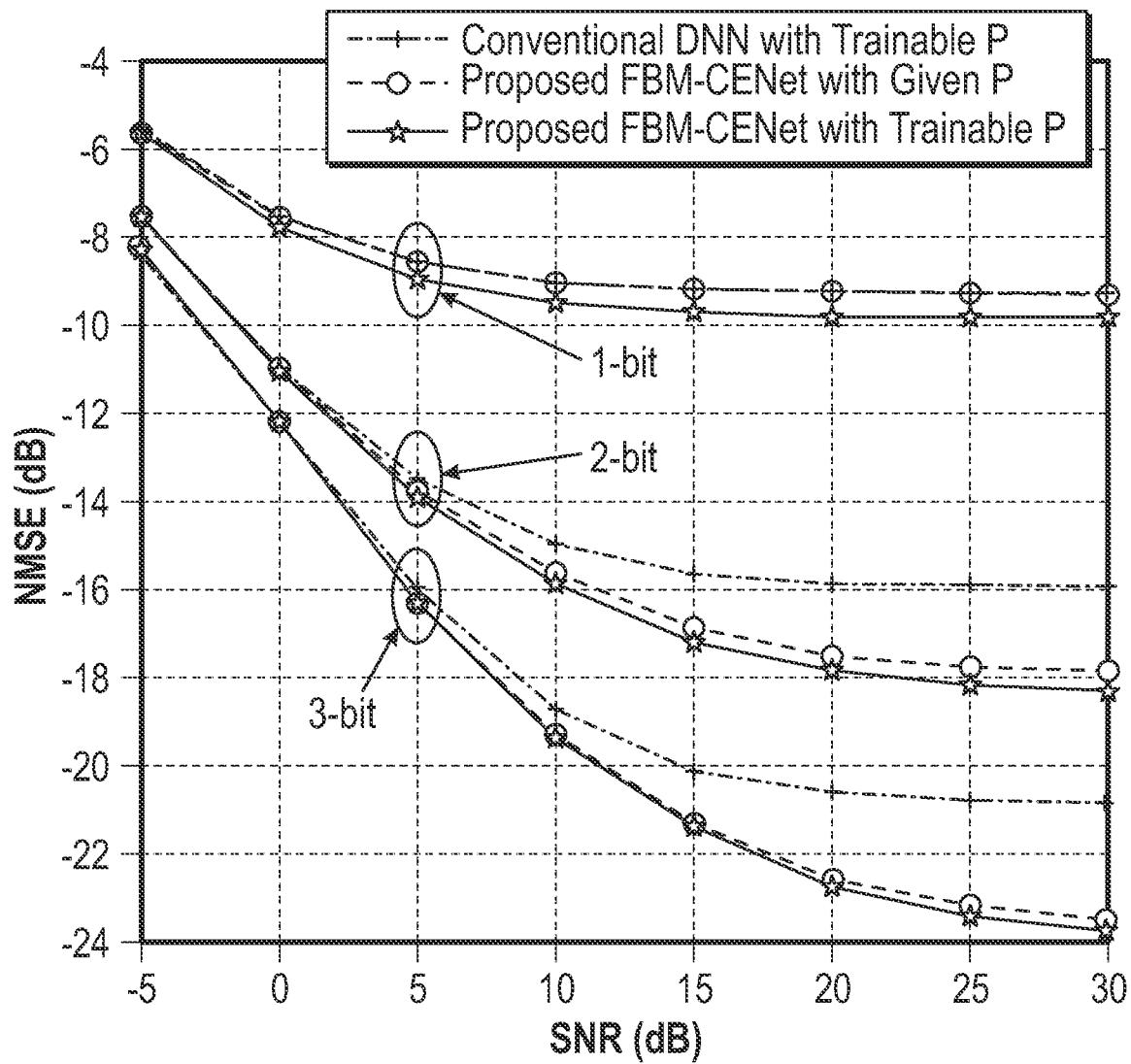
FIG. 14 depicts another channel estimation performance comparison.

Example 2-Channel Estimation Comparison with Pilot Matrix Trained Concurrently with the Channel Estimator A conventional channel estimator, in comparison with the channel estimation network (denoted as FBM-CENet in FIG. 14), whether the pilot matrix P is given or trainable, outperforms the conventional channel estimator as SNR increases. The structure of channel estimator network takes advantage of domain knowledge in the machine learning estimation framework. When the pilot matrix is given, it is shown that jointly optimizing the pilot matrix and the estimator can improve the estimation accuracy.

Example 3-Data Detection Performance Comparisons

Figures 15A, 15B, 15C:
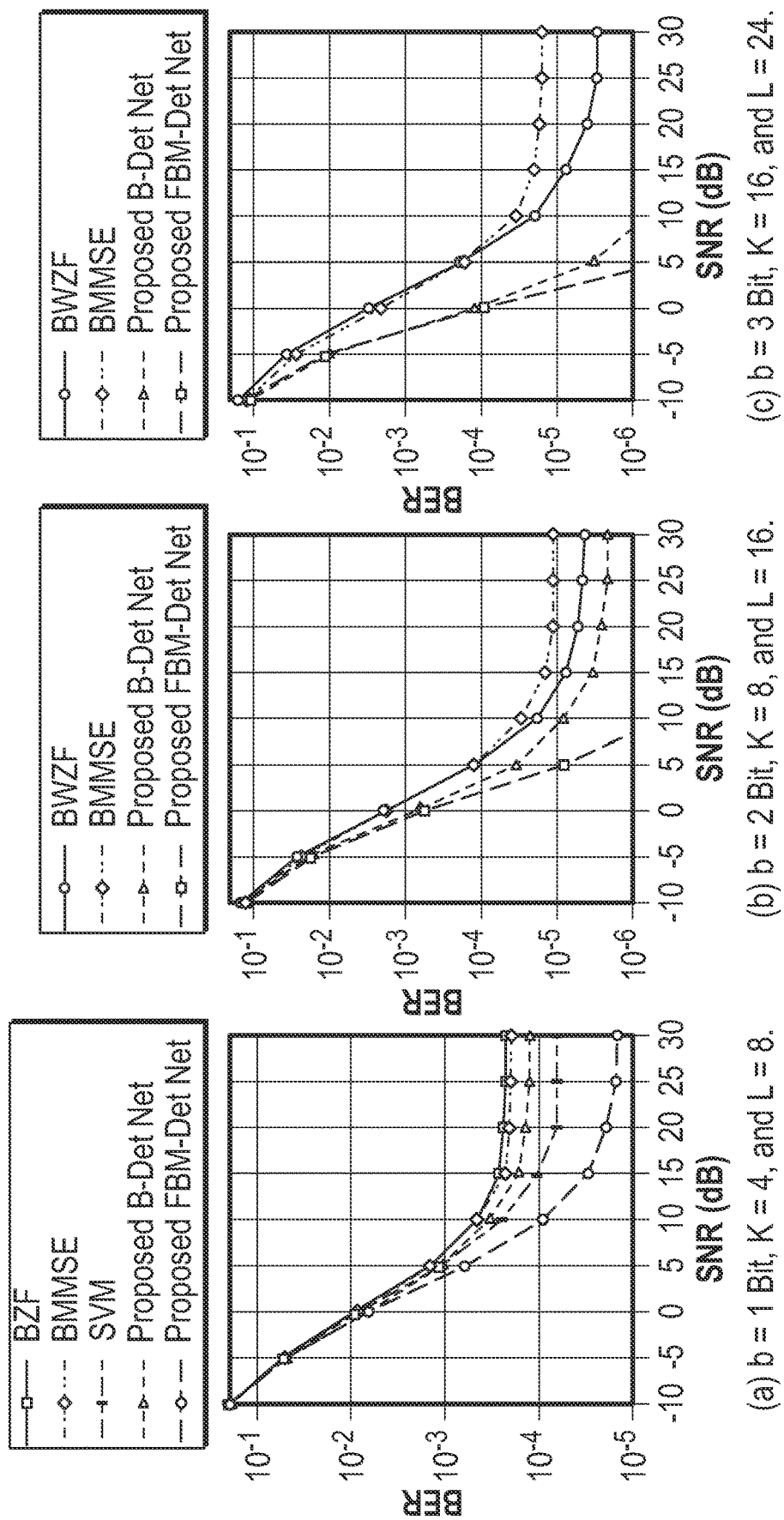
FIGS. 15A, 15B and 15C depict performance comparisons for data detection methods with QPSK signaling.
Figures 16A, 16B, 16C:
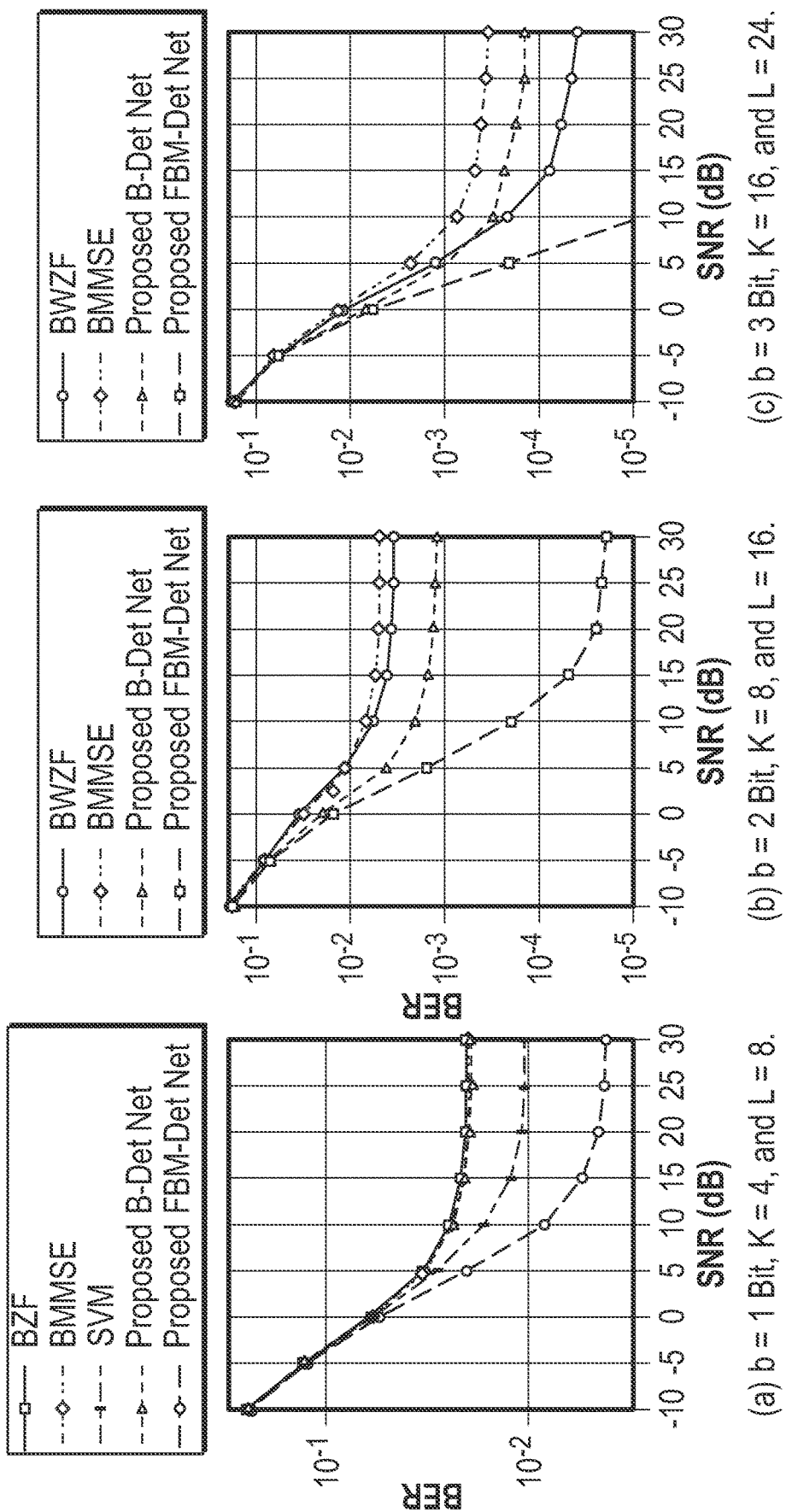
FIGS. 16A, 16B and 16C depict performance comparisons for data detection methods with 16-QAM signaling.

FIGS. 15A-C and FIGS. 16A-C show performance comparisons between the first and second data detection networks (denoted as B-DetNet and FBM-DetNet, respectively) and other data detection methods (BZF, BMMSE, SVM). The estimated channel state information obtained by the channel estimator network with a trainable pilot matrix is used to generate the data in the figures. FIGS. 15A-C shows performance comparisons for Quadrature Phase Shift Keying (QPSK) signaling and 16-Quadrature Amplitude Modulation (QAM) signaling. FIG. 15A and FIG. 16A use a 1-bit ADC with K=4 and L=8. FIG. 15B and FIG. 16B use a 2-bit ADC with K=8 and L=16. FIG. 15C and FIG. 16C use a 3-bit ADC with K=16 and L=24. The second data detection network outperforms all other data detection methods regardless of bit-ADC, number of layers, and number of single antenna users. The first data detection method relying on a linearized system model, the effective noise being approximated as Gaussian, and the distortion covariance matrix being approximate all contribute to its performance lagging behind that of the second data detection network.

What is claimed is:

1. A computer-implemented method for channel estimation in a multi-input multi-output (MIMO) communication system comprising antenna base stations and single antenna users, the method comprising:
receiving a signal at a computer processor programmed to execute a deep neural network (DNN) comprising:
at least one channel estimation layer configured to receive a channel estimation input, wherein the channel estimation input has a size of 2NK elements, wherein N is a number of the antenna base stations and K is a number of the single antenna users; and
wherein the at least one channel estimation layer comprises at least one weight matrix and at least one bias vector, wherein the at least one weight matrix embeds a pilot signal and the at least one bias vector corresponds to received signals, wherein the DNN is trained to jointly optimize the at least one channel estimation layer at the base stations and the pilot signal transmitted from the users, wherein the at least one channel estimation layer outputs a channel estimation output of the same size as the channel estimation input.

2. The method of claim 1, further comprising designing a first data detection network, the method comprising:
at least one first data detection layer receiving a first data detection input, with the first data detection input being of a size of 2K elements; and
the at least one first data detection layer outputting a first data detection output of the same size as the first data detection input.

3. The method of claim 2, wherein the first data detection network comprises trainable parameters comprising a first data detection step size and a scaling parameter.

4. The method of claim 1, further comprising designing a second data detection network, the method comprising:
at least one second data detection layer receiving a second data detection input, with the second data detection input being of a size of 2K elements; and
the at least one second data detection layer outputting a second data detection output of the same size as the second data detection input.

5. The method of claim 4, wherein the second data detection network comprises trainable parameters comprising a second data detection step size, a projector scaling parameter, and a Sigmoid activation function scaling factor.

6. The method of claim 5, wherein the trainable parameters further comprise channel estimation step size, and a scaling parameter inside the Sigmoid activation function.

7. The method of claim 1, wherein the channel estimation input is inputted into a transmitter filter.

8. The method of claim 7, wherein the transmitter filter is one of a linear filter and a non-linear filter.

9. The method of claim 1, wherein the channel estimation output exits from a receiver filter.

10. The method of claim 9, wherein the receiver filter is one of a linear filter and a non-linear filter.

11. The method of claim 1, wherein the at least one channel estimation layer comprises two weight matrices and two received signals.

12. The method of claim 1, wherein the DNN further comprises a set of hidden layers.

13. The method of claim 12, wherein the set of hidden layers are selected from the group consisting of Rectified Linear Unit activation function and the Tanh activation function.

14. The method of claim 1, wherein the method is executed using a program selected from MATLAB, Python, C, and a programming language that handles algorithms and signal processing.

15. A computer program product comprising a non-transitory readable medium including computer executable code that, when executed on one or more computing devices, performs steps of:
estimating channels within a multi-input multi-output (MIMO) communication system comprising antenna base stations and single antenna users, wherein estimating comprises training a deep neural network (DNN) having at least one channel estimation layer configured for receiving a channel estimation input, with the channel estimation input being of a size of 2NK elements, wherein the at least one channel estimation layer comprises at least one weight matrix and at least one bias vector, wherein the at least one weight matrix corresponds to a pilot signal matrix and the at least one bias vector corresponds to received signals, wherein training the DNN comprises jointly optimizing the at least one channel estimation layer at the antenna base stations and a pilot signal transmitted from the single antenna users; and generating a channel estimation output of the same size as the channel estimation input;

wherein N signifies a number of the antenna base stations and K signifies a number of the single antenna users.

16. The product of claim 15, further comprising a first data detection network, the product performing steps of:

at least one first data detection layer receiving a first data detection input, with the first data detection input being of a size of 2K elements; and the at least one first data detection layer outputting a first data detection output of the same size as the first data detection input.

17. The product of claim 15, further comprising a second data detection network, the product performing steps of:

at least one second data detection layer receiving a second data detection input, with the second data detection input being of a size of 2K elements; and the at least one second data detection layer outputting a second data detection output of the same size as the second data detection input.

18. A system comprising:

a computing device including a network interface for communications over a data network, the data network comprising a multi-input multi-output (MIMO) communication system comprising antenna base stations and single antenna users;

a channel estimator network comprising a deep neural network (DNN) having at least one channel estimation layer configured for receiving a channel estimation input, with the channel estimation input being of a size of 2NK elements, the at least one channel estimation layer comprising at least one weight matrix and at least one bias vector, wherein the at least one weight matrix corresponds to a pilot signal matrix and the at least one bias vector corresponds to received signals, wherein the DNN is trained to jointly optimize the channel estimator network at the base stations and a pilot signal transmitted from the users; and the at least one channel estimation layer outputting a channel estimation output of the same size as the channel estimation input;

wherein N signifies a number of the antenna base stations and K signifies a number of the single antenna users.

19. The system of claim 18, further comprising a first data detection network, with at least one first data detection layer of the first data detection network receiving an input, the input being of a size of 2K elements, and the at least one first data detection layer outputting a first data detection output of the same size as the first data detection input, wherein N signifies number of antenna base stations and K signifies number of single antenna users.

20. The system of claim 18, further comprising a second data detection network, with at least one second data detection layer of the second data detection network receiving a second data detection input, the second data detection input being of a size of 2K elements, and the at least one second data detection layer outputting a second data detection output of the same size as the second data detection input, wherein N signifies number of antenna base stations and K signifies number of single antenna users.

* * * * *